Oct. 24, 1933.    H. MINTER    1,932,225
AUTOMATIC CONVEYER TRUCK
Filed April 22, 1933    2 Sheets-Sheet 1

HUGH MINTER
By Mason Fenwick & Lawrence
Attorneys

Oct. 24, 1933.                    H. MINTER                    1,932,225
AUTOMATIC CONVEYER TRUCK
Filed April 22, 1933            2 Sheets-Sheet 2
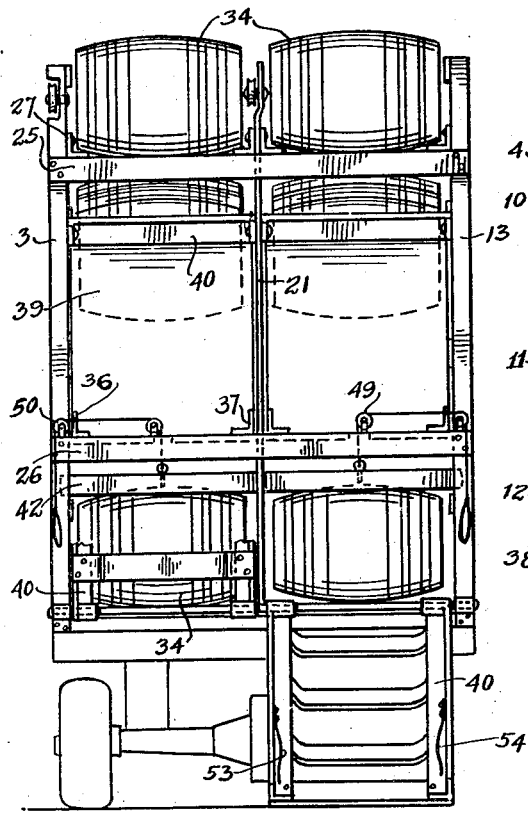
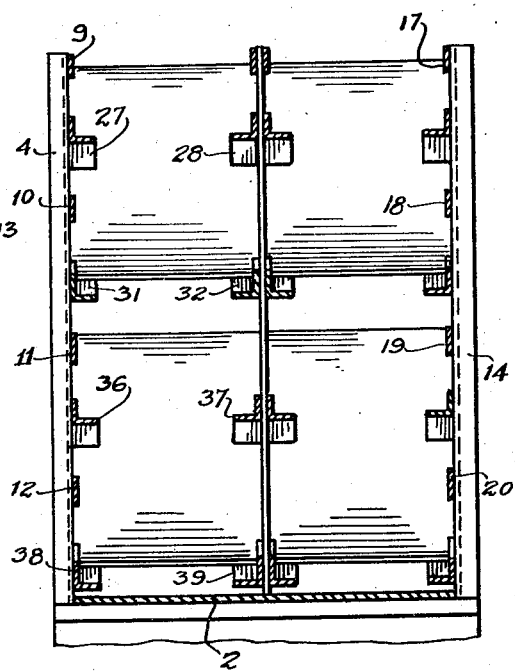
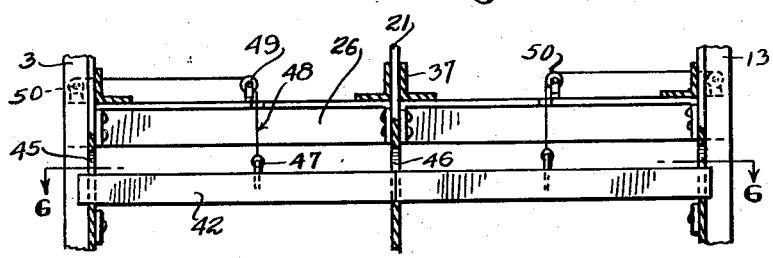
Inventor
HUGH MINTER
By Mason Fenwick&Lawrence
Attorneys Patented Oct. 24, 1933

1,932,225

UNITED STATES PATENT OFFICE 1,932,225

AUTOMATIC CONVEYER TRUCK

Hugh Minter, Baltimore, Md.

Application April 22, 1933. Serial No. 667,432

3 Claims. (Cl. 214—65)

This invention relates to trucks in general, and more particularly to trucks adapted to carry barrels or other objects in cylindrical form.

In this art it has been customary heretofore to pile cylindrical objects such as rolls of paper, pipes, barrels, etc., with their axes vertical and one on top of the other, or side by side. This arrangement necessitated the lifting of these cylindrical objects bodily during loading and unloading. Usually, this is a very tedious job, requiring great strength, since many of the objects in this cylindrical form are ordinarily of great weight. For example, objects such as barrels of white lead, rolls of printing paper, sections of pipe are always of great weight, and in the prior systems of loading and unloading required two or more men to load them onto or unload them from the truck or other vehicle carrying them.

The present invention is designed to facilitate the handling of cylindrical objects of the character referred to and to utilize the force of gravity to enable the trucks to be loaded and unloaded practically automatically and without requiring the objects to be lifted bodily from one position to another.

A further object of the invention is to provide means whereby the gravity controlled movements of the article during the loading and unloading may be retarded at predetermined points in their rolling movements through the apparatus embodying this invention.

Another object of the invention is to provide a means on trucks of this character to control the unloading of the cylindrical objects either singly or in any desired number.

Other objects of the invention will become apparent as the detailed description thereof proceeds.

In the drawings:

Figure 3 is an end elevation of the truck;

Figure 4 is a vertical transverse section taken on the line 4—4 of Figure 2;

Figure 5 is a fragmentary end elevation, parts shown in section of a means to control the discharge of the object from the truck; and Figure 6 is a horizontal section taken on the line 6—6 of Figure 5.

Figure 1:
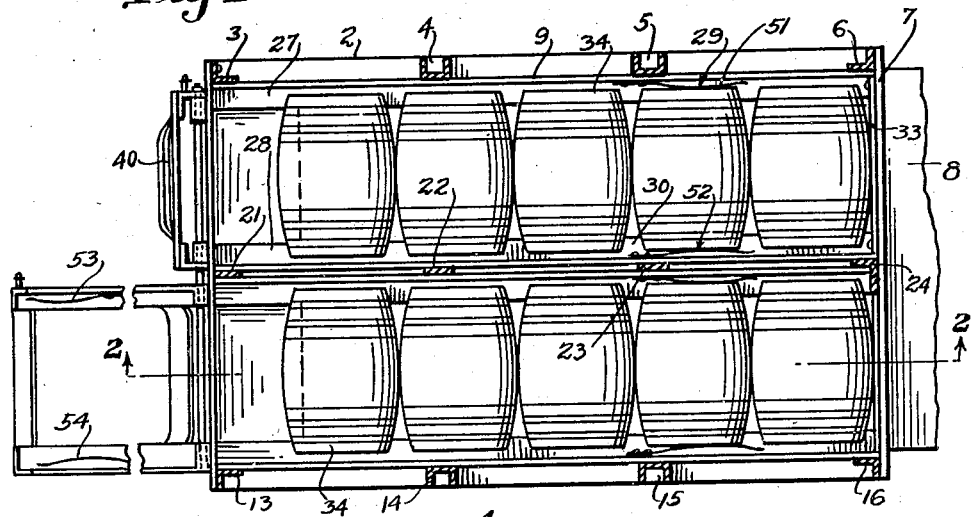
Figure 1 is a fragmentary plan view of a truck embodying the present invention.

As shown in the drawings, the invention comprises a truck chassis designated generally by the reference numeral 1, comprising the usual platform 2 supported by any suitable framework on wheels W. The loading and unloading structure mounted on the platform 2 comprises standards 3, 4, 5 and 6 suitably secured at their lower ends at one side of the platform 2. The standard 6 may be bolted or otherwise secured to the rear wall 7 of the driver's cab 8. The upper ends of the standards 3, 4, 5 and 6 are secured in parallel relation to each other by means of a longitudinal strut 9. Intermediate struts 10, 11 and 12 connected to standards 3, 4, 5 and 6 form with said standards a skeleton wall defining the left hand side of the truck body looking from the rear end thereof.

The right hand side of the truck body is formed by the standards 13, 14, 15 and 16, the standard 16 being secured to the rear wall 7 of the driver's cab 8 parallel to the standard 6 at the other side of the truck body. The upper end of these standards 13, 14, 15 and 16 are connected rigidly to each other by the runner 17; and runners 18, 19 and 20 are riveted or otherwise secured to the standards 13, 14, 15 and 16 in proper spaced apart relation to form the right hand skeleton wall of the truck body looking from the rear of the truck.

The body is divided into two sections by an intermediate skeleton wall which is formed by the standards 21, 22, 23 and 24, suitably secured at their lower ends to the platform 2. The standard 24 is suitably secured to the rear wall 7 of the driver's cab 8 and parallel to the standards 6 and 16. A cross bar 25, welded or otherwise secured to standard 21, is secured at its opposite ends and near the upper ends of the standards 3 and 13 to brace the side walls of the truck in parallel relation to each other. An intermediate cross brace 26 connects the standards 3, 13 and 21 for the purpose of bracing the whole skeleton structure rigidly to form the conveyer framework.

Figure 2:
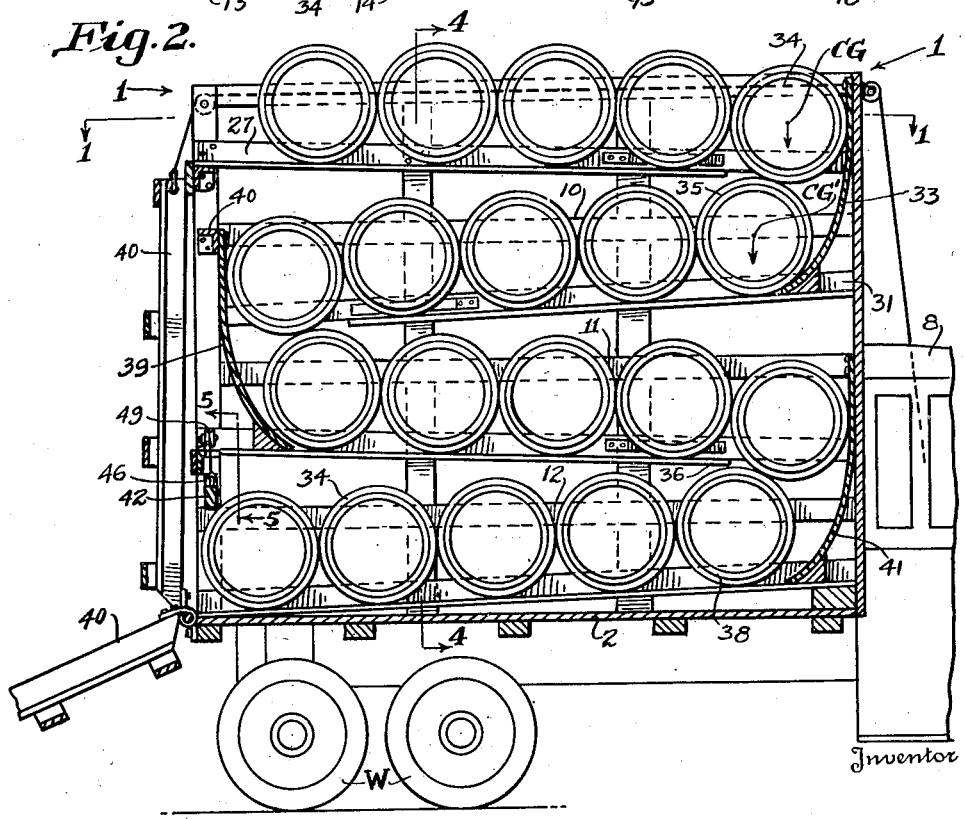
Figure 2 is a central vertical section taken on the line 2—2 of Figure 1.

As will be apparent from Figures 1 and 2 of the drawings, the truck body comprises two zigzag conveyers arranged side by side either of which can be loaded or unloaded independently of the other. Since each conveyer is structurally identical with the other, only one will be described in detail, with the understanding that the description applies to both. While the drawings disclose a truck body having two of such conveyers arranged side by side, it will of course be understood that there may be any number of these conveyers so arranged, and that their lateral dimensions will depend upon the length of the cylindrical objects intended to be loaded thereon and unloaded therefrom.

The zig-zag conveyer at the left hand side of the truck body starts with an angle iron 27 suitably riveted or otherwise secured to the standards 3, 4, 5 and 6 near the upper end of said standards. A second angle iron 28 is suitably riveted or otherwise secured to the standards 21, 22, 23 and 24. These angle irons are arranged parallel to each other and inclined slightly downward from the rear of the truck framework toward the wall 7 of the driver's cab 8. The vertical flanges of the angle irons 27 and 28 extend the entire length of the truck body and are secured as described to the aforesaid standards. The horizontal flanges of the angle irons 27 and 28 are cut away adjacent the wall 7 of the driver's cab to provide a space through which a barrel or like object may descend by gravity to a similar pair of angle irons secured to the aforesaid standards and inclined in the opposite direction to that of the angle irons 27 and 28.

The horizontal flanges 29 and 30 are cut away from the end wall 7 at a distance slightly greater than the diameter of the barrel or other objects being loaded or unloaded in order to direct the barrel onto the lower runway formed by the angle irons 31 and 32. A curved plate 33 is suitably secured at one end to the wall 7 of the driver's cab and extends therefrom downwardly to be connected to the lower angle iron runways 31 and 32. The curvature of this member 33 must be such as to prevent jamming of the objects as they pass from any upper runway to a lower runway. For example, the curvature of the plate 33, as shown in Figure 2 of the drawings, is such that the center of gravity CG of the barrel 34 is displaced to the right of the center of gravity CG1 of the barrel 35 so that the weight of the barrel 34 tends to force the barrel 35 downwardly along the angle iron runways 31 and 32 in the discharge direction.

The angle iron runways 31 and 32 conduct the barrels by gravity to the rear end of the truck and their horizontal flanges are cut away in the same manner as the horizontal flanges of the angle irons 27 and 28, to provide a space through which the barrels may drop onto the angle iron runways 36 and 37 which are slightly inclined from the back to the front of the truck. A plate 39 is secured at its upper end to the angle iron 40 extending between the standards 3 and 21 and is curved in the same manner as the plate 33 to prevent the barrels becoming jammed during their movements from one runway to the next lower one.

The angle iron runways 36 and 37 are likewise secured to the standards 3, 4, 5 and 6 and 21, 22, 23 and 24, respectively, and are arranged substantially parallel to the runways 27 and 28 directly above them. The runways 36 and 37 have their horizontal flanges cut away to permit the passage of barrels onto the lower runways 38 and 39, which are inclined downwardly from front to the rear end of the truck in position to discharge their load onto the unloading track member 40, pivotally secured to the platform 2 and framework supporting it. A curved plate 41 conducts the barrels or other objects from the runways 36 and 37 to the runways 38 and 39.

At the discharge end of the conveyer mechanism, a stop bar 42 is positioned to contact with the upper part of the barrels and prevent their discharge from the truck. The stop bar 42 constitutes a weight rabbeted at each end to provide tongues 43 and 44 adapted to slide in slots 45 and 46, formed respectively in the vertical flange of the standard 3 and in the standard 21. The weight bar 42 is provided at its center with a hook 47 connected to the end of a flexible cable 48 which passes over a pulley 49 suitably secured to the cross brace 26 and to a pulley 50 suitably mounted on the angle iron standard 3.

It will be apparent from Figure 2 of the drawings that as the barrels roll downwardly along the runways 38 and 39, they will encounter the weight bar 42 unless that weight be lifted out of the path of roll of the barrels. The operator may raise the weight to release one barrel or any desired number at a time. Obviously, after the discharge of any one of the barrels, the release of the weight will throw it into the path of movement of the next barrel and prevent the discharge until the weight is raised once more.

In order to retard the movements of the barrels or similar cylindrical objects during their travel through the conveyer, each of the pairs of runways is provided at its end adjacent the nearest runway with a pair of spring-like retarding members which engage the opposite ends of the barrels resiliently to slow down their movements. The angle iron runways 27 and 28, for example, are provided with the resilient retarding members 51 and 52 near the ends where they discharge onto the next lower runway. Similarly, each of the other runways is provided with retarding means for this purpose.

The discharge track 40 is also provided near its free end with similar retarding members 53 and 54 to slow down the movements of the barrel or like objects at the point of their discharge from the truck. These discharge members 40 may be swung about their pivots up against the rear framework of the truck body by means of cables 55 operable at some point accessible to the driver in the driver's cab 8, or may be operated from ground at rear of truck, whereby they may be raised or lowered when desired. These discharge members 40 act as doors, controllable from the driver's cab to prevent discharge of the load in case any mischievous person should operate the bars 42 and thereby release the objects on the conveyer.

While the conveyer is shown as extending lengthwise of the truck chassis, it must be understood that this is for the purpose of illustration only, since it is obvious that the conveyer structure may be arranged to load and unload sideways of the chassis; or may be mounted on a turntable on platform 2 to load or unload in any direction. It will also be understood that the invention is not to be considered as limited to any particular number of vertically superposed runways, or to any particular number of conveyer sections arranged side by side.

It is thought that the invention and its attendant advantages will be understood from the foregoing description, and it is obvious that numerous changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. A truck comprising: a platform, a zig-zag conveyer mounted on said platform to receive cylindrical objects at the upper end and discharge them by gravity at its lower end, means fixed to and spaced apart along said conveyer to retard the movements of said bodies through said conveyer, and means at the discharge end of the conveyer to control the discharge of such objects therefrom.

2. A truck body comprising: a platform, skeleton framework mounted on said body and including vertically superposed runways arranged to form a zig-zag gravity conveyer, a bar slidable vertically in the framework at the discharge end of the conveyer into and out of the path of movement of articles rolling by gravity through the conveyer, means for sliding said bar in said framework, and means fixed to and spaced apart along said runways to retard the movements of said articles through the conveyer.

3. A truck body comprising: a platform, skeleton framework mounted on said body and including vertically superposed runways arranged to form a zig-zag gravity conveyer, a bar slidable vertically in the framework at the discharge end of the conveyer into and out of the path of movement of articles rolling by gravity through the conveyer, yielding means fixed to and spaced apart along said runways to retard the movements of articles through the conveyer, and a cable connected to said bar and extending across the framework to control the raising and lowering of said bar.

HUGH MINTER.